United States Patent [19]

Hart

[11] 3,891,368

[45] June 24, 1975

[54] SYSTEM FOR CONTROLLING THE DEPOSITION OF A COATING MATERIAL ONTO A PIPE OR THE LIKE

[76] Inventor: Milburn L. Hart, P.O. Box 15822, Tulsa, Okla. 74115

[22] Filed: Mar. 22, 1974

[21] Appl. No.: 453,706

[52] U.S. Cl. ................. 425/114; 264/40; 425/147; 425/817 C
[51] Int. Cl. .............................................. B29c 3/06
[58] Field of Search ............... 118/7, 8; 264/40, 45; 425/4 R, 4 C, 817 R, 113, 817 C, 114, 150, 147, 145, 141, 140; 164/154, 155

[56] References Cited
UNITED STATES PATENTS

| | | | |
|---|---|---|---|
| 2,889,596 | 6/1959 | Savage et al. | 164/155 X |
| 3,216,059 | 11/1965 | Voelskow | 425/147 |
| 3,443,984 | 5/1969 | Stewart | 425/113 X |
| 3,557,403 | 1/1971 | Lemelson | 425/147 X |
| 3,816,043 | 6/1974 | Snelling et al. | 425/817 C X |

FOREIGN PATENTS OR APPLICATIONS 805,834  1959  United Kingdom ................ 425/147

Primary Examiner—R. Spencer Annear
Assistant Examiner—Mark Rosenbaum
Attorney, Agent, or Firm—William S. Dorman

[57] ABSTRACT

Apparatus for controlling the relative rate of introduction of a foam material into an annular cavity formed around the outside of an elongated object, such as a pipe, including a pair of material detectors spaced apart longitudinally along the pipe and operatively associated with a relatively movable head which carries the means for introducing the foam material into the annular cavity. A motive means is also included to provide for relative longitudinal movement of the head along the pipe. As the head moves longitudinally with respect to the pipe in the annular cavity, it is designed to introduce sufficient foam material to fill the cavity with what appears to be a "moving donut," the forward portion of which can be considered as the "flow front." As the flow front is sensed by either of the two material detectors, the latter will vary the speed of the motive means to increase or decrease the relative linear rate of travel of the head with respect to the pipe so as to maintain a nearly constant relative distance between the head and the flow front. The material detectors can be positioned either externally or internally with respect to the annular cavity depending upon whether the outer "jacket" is translucent or opaque. A third material detector, operatively associated with the other two material detectors, is positioned to detect the vertical angle of the flow front; as the angle of the flow front varies from the vertical, the material detectors will operate to return the flow angle to the vertical and to maintain it there by controlling the introduction of a flow controlling agent into the foam material.

9 Claims, 11 Drawing Figures

PATENTED JUN 24 1975　　　　　　　　　　3,891,368

SHEET 2

SYSTEM FOR CONTROLLING THE DEPOSITION OF A COATING MATERIAL ONTO A PIPE OR THE LIKE

BACKGROUND OF THE INVENTION

1. Field of the Invention

This invention relates generally to the coating of elongated objects and, more particularly, to improvements in method and apparatus for continuously monitoring and controlling application rates and flow properties of foam materials for outer coatings to pipes or the like.

2. Description of the Prior Art

It is sometimes necessary to insulate the outer periphery of a pipeline, or the like, and it is oftentimes desirable to provide an additional outer jacket around the insulation material for protection. One method employed for achieving such pipe and jacket coating is described and illustrated in U.S. Pat. No. 3,709,751, entitled "Pipe Insulating Method and Apparatus," by Milburn L. Hart, the inventor hereof, and Ronald E. Carlson, and dated Jan. 9, 1973, which is hereby incorporated herein by reference. Briefly, the pipe coating apparatus therein described comprises a relatively short mandrel adapted to be disposed longitudinally over an installed pipe. An annular head member is connected at one end of the mandrel with a relatively long length of plastic film sleeve or tubing disposed around its outer periphery, the film being essentially in an accordian pleated initial position. One end of the plastic tubing is disposed around the outer periphery of the head member and is anchored to an adjacent pipe section prior to the insulation operation. The other end of the plastic tubing is connected to the other end of the mandrel. The head member is in engagement with the outer periphery of the pipe, and a passageway tube extends along the length of the unit between the mandrel and the plastic sleeve to provide communication between the exterior of the unit and the head. The components of a suitable foam insulating material, such as polyurethane type foam, are directed through the passageway tube and discharged in the area adjacent the head member. The foam material "sets up" very quickly and fills the annular chamber around the pipe so as to form what appears to be a "moving donut." As the mandrel moves along the pipe, the end of the plastic sleeve is pulled simultaneously therewith for unfolding of the sleeve and pulling the sleeve snugly over the outer periphery of the foam applied around the pipe. The operation is continued until the entire length of the plastic sleeve has been unfolded.

The usual method of controlling the application rates and the flow properties of the insulation material has been through visual or manual means, sometimes in conjunction with presently available independent automatic controls. These controls are typically predetermined by establishing a programmed relationship between material flow rates and travel or coating speeds. In the case of expanding or chemically reactive coating, coordination between material flow rates and machine or application speeds are most often critical since the reactivity of the coating or insulating material has a minimum tolerance for application variations. As a result, uniformity and quality of application is difficult to attain.

When depositing or injecting urethane foam or a coating into the annular cavity continuously, it is advantageous to have application rates and flow properties controlled by the coating or insulating material itself in order to ensure a constant relationship between the material delivery means and the applied material, regardless of external variations or material flow rates. Many internal and external variables such as, temperature changes (material and ambient), material delivery output fluctuations, material formulation variations, power fluctuations, intermittent flow restrictions through valves and orifices, normal variations in cavity or annular volumes (caused by product tolerances), and other considerations, affect the efficiency and ultimate quality of the finished product. Most existing processing and application techniques incorporate various control mechanisms. Although many are automatic controls, they are semi-independent control systems preset to maintain a computed or programmed set of conditions. In order for these independent controls to interact with each other to correct multiple variations, relative control systems are added to the already complex basic control systems. These interconnecting systems often become more complex and prohibitive than the basic controls. Futhermore, cumulative tolerances of the basic control units can cause the final variation allowables to exceed the optimum. It is desired that the control system be able to continuously modify the application rates and material flow characteristics as certain other tolerance variations occur in the product, material, support equipment, and control units.

Another problem encountered in the prior arts systems is that changes in application rates and material flow characteristics are not fully responsive. For example, the time delay between the relaying of control signals to either manual operators or preprogrammed controls and the initiation of the corrective response often results in excessive areas along the pipe at which a uniform coating is not achieved.

Still another factor of consideration is the human element in manual or visual controls which are continuously monitored. On long continuous runs, operator fatigue becomes a significant problem, which can present itself in a final product which is not of the desired quality.

What is needed is a method and apparatus for automatically controlling the rate of deposition of a foam insulation material onto a pipe to achieve a uniform coating thereof. Additionally, automatic means are needed to control the flowability of the foam or coating applied for further uniform coat achievement.

SUMMARY OF THE INVENTION

In light of the above, it is, therefore, an object of the invention to provide a method and apparatus for controlling the rate of application and the flow properties of a foam material onto an elongated object, such as a pipe.

It is a further object of the invention to provide a control method and apparatus as set forth above in combination with an apparatus designed to introduce the foam material into an annular cavity created around the pipe or elongated object.

It is another object of the invention to provide a method and apparatus which can be employed to control the flowability of a foam insulation layer deposited upon a pipe or the like.

It is yet another object of the invention to provide a method and apparatus for controlling the application of a foam insulation layer upon a pipe which can be operated without continuous supervision.

It is another object of the invention to provide a method and apparatus which achieves timely response to variations for rapid correction of application rates and flow characteristics.

These and other objects, features, and advantages will become apparent to those skilled in the art from the following detailed description, when read in conjunction with the appended claims and accompanying drawings.

In accordance with the invention, in its broad aspect, material presence detectors are used with an apparatus wherein an annulus is formed between an outer jacket or tube and a pipe and wherein a material is increase into the annulus to coat the pipe from a deposition assembly detectors which is moved longitudinally relative to the pipe. The detectors are spaced apart longitudinally along the pipe to decrease the relative longitudinal speed of movement of the deposition assembly with respect to the pipe (and thereby increasr the relative deposition rate), if the material is not detected at the detector furthermost from the deposition assembly. The dedectors are further designed to increase the relative linear rate of travel of the deposition assembly (and thereby decrease the relative deposition rate) if the material is detected at the detector closest to the deposition assembly.

In another aspect of the invention, a third material presence detector is employed. The third detector cooperates with the other two detectors to sense the vertical plane of the flow front of the moving donut. When the flow front deviates from the vertical, these detectors activate an additional means which is designed to vary (increase or decrease) the rate of introduction of a flow controlling agent into the foam material to return the flow front to its optimum vertical disposition.

BRIEF DESCRIPTION OF THE DRAWING

The invention is illustrated in the accompanying drawing wherein.

DETAILED DESCRIPTION OF THE PREFERRED EMBODIMENTS

Figure 1:
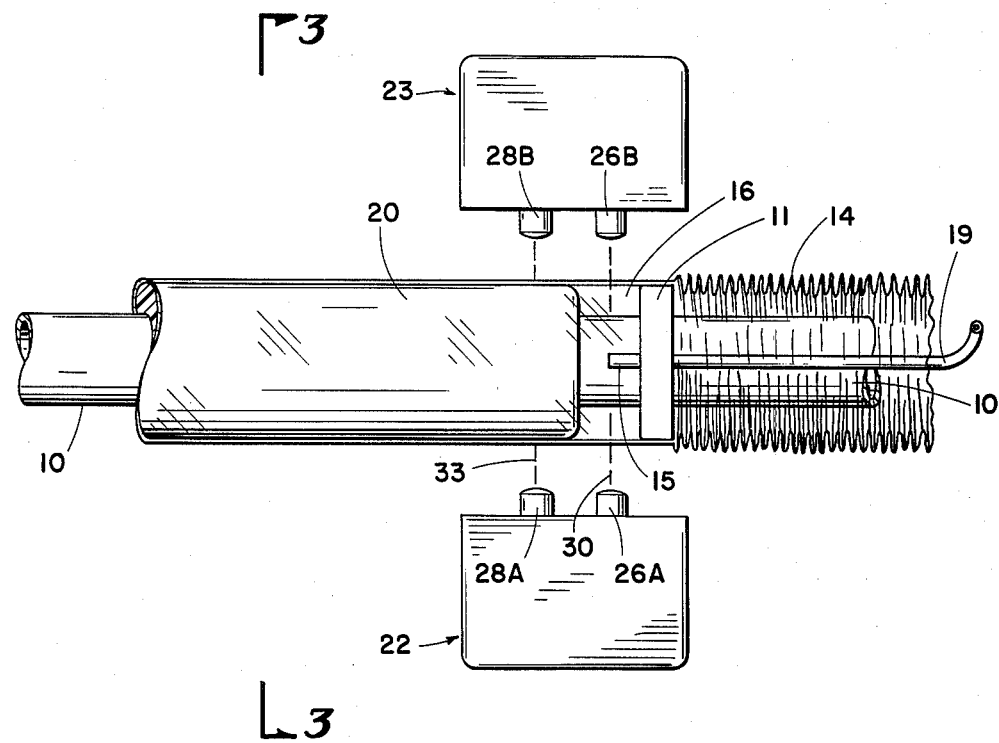
FIG. 1 is a plan view of a pipe coating apparatus and coating material deposition rate sensor, in accordance with the principles of the invention.

The detector and control assembly, in accordance with the invention, is employed in conjunction with an apparatus for applying a material of foam insulation or the like to a pipe, as shown in FIG. 1. The apparatus for applying the foam layer to a pipe 10 includes a head 11 which surrounds the pipe 10 and, for purposes of illustration only, which carries a long length of a film material 14, of plastic or the like, pleated in an accordian fashion and carried upon a mandrel (not shown) connected to or associated with the head as shown, for example in U.S. Pat. No. 3,709,751 referred to above. The head 11 also presents a nozzle 15, which is located between the pipe 10 and the film material 14 in the annulus 16 therebetween. The ingredients for forming a foam coating upon the pipe are mixed (mixer not shown) and conducted to the nozzle 15 by a plastic or flexible tube 19, which conducts the ingredients from a source (not shown).

As the foamm material 20 is deposited upon the pipe 10 from the nozzle 15 within the annulus 16, the pipe is moved relative to the head 11, stretching additional lengths of the film material 14 thereover to provide additional space 16 within which the foam can be deposited. This deposition is accomplished in a continuous process until the entire length of the film material 14 has been expended, at which time the mandrel is reloaded with new film material and the process continued.

The relative movement between the pipe 10 and the head 11 can be achieved in several ways. For example, the head 11 can be mounted at a fixed location, and the pipe 10 moved by conveyor means (not shown) past the mandrel, receiving the insulation coating 20 as above described, as it passes. Alternatively, the head 11 can be moved upon the pipe 10, for example, by a powered crawler unit (not shown) connected to the head and mounted for movement over the stationary pipe, or other elongated object.

Figure 2:
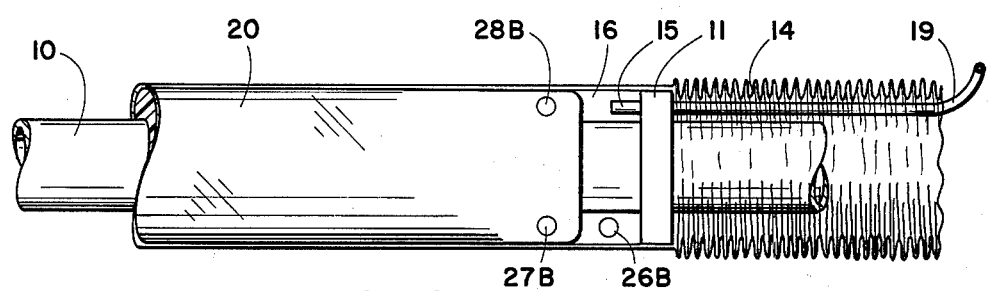
FIG. 2 is a side elevation of a portion of the apparatus of FIG. 2.
Figure 3:
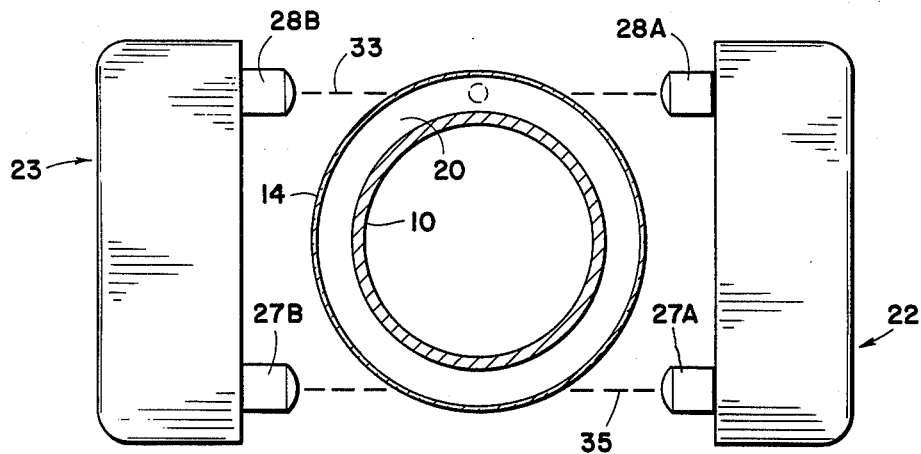
FIG. 3 is an end view taken at 3—3 in FIG. 1.

The deposition of the foam material is controlled by the use of foam presence detectors adjacent the location at which the foam is deposited. To achieve this detection, in accordance with the invention, detector assemblies, generally indicated by the reference numerals 22 and 23 are provided each located on a respective side of the pipe and deposition assembly. Detectors 26, 27, and 28 are carried by the detector assembly 22 and 23 as shown. The detectors 26–28 in the embodiment illustrated are of the type in which light is emitted from one element thereof and sensed by another element thereof in the line of sight of the first element. In the embodiment shown, the light emitting portion of the detectors is designated by an A and the light sensing portion of the detectors is designated by a B. Thus, light is emitted from one emitter, for example, emitter 26A, which travels along a path illustrated by the dotted line 30 through the transparent film 14 to be detected by the sensor 26B (if, as shown in FIGS. 1 and 2, the foam material deposited is not interfering with the light path). The detectors 26–28 are arranged such that if no foam material to be coated onto the pipe is present, a light path will exist between the light emitter and light sensor elements, at a level between the periphery of the pipe, and the level at which the foam material is desired to be deposited. Thus, as shown in FIG. 3, for example, the light between the light emitter element 28A and light sensor element 28B follows a path shown by the dotted line 33 above the pipe 10, but below the surface of the foam material 14. In a like manner, the light from the light source 27A follows the dotted path 35 which is below the periphery of the pipe 10, but above the periphery of the deposited foam material 20.

It should be noted that although the foam material sensors are described as being of the light sensitive variety, other types can be used equally well, such as infra-red sensors responsive to the heat of the applied material, or ultra-sonic sensing devices.

As shown, the detectors 26–28 are arranged in a triangular pattern, as viewed from the side, shown in FIG. 2. Thus, detectors 26 and 27 are located below the pipe 10, in a plane parallel to the axis of the pipe, and detectors 27 and 28 are located on opposite sides of the pipe 10, in a plane generally perpendicular to the axis of the pipe 10. It can be seen, therefore, that the detectors 26–28 are located to be connectable to indicate the presence or not of the insulation material or foam material 20 deposited onto the pipe 10, by its interference or not with the light path between the respective halves, the source and sensor, of the detectors.

Figure 4:
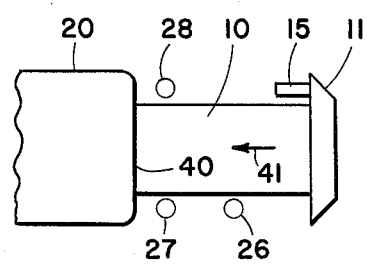
FIG. 4 is a side elevation diagrammatically showing the apparatus of FIG. 2 with material deposited at an insufficient rate as compared with the relative linear speed of the head.

The possible foam deposition configurations are shown in FIGS. 4–8. As shown in FIG. 4, the insulation material 20 is deposited at a location on the pipe beyond both of the detectors 26 and 27 with respect to the nozzle 15. This is a condition at which the foam is being deposited at too slow a rate (with respect to the relative linear speed of the head 11), and which can result in a coating which is too thin upon pipe 10.

Figure 5:
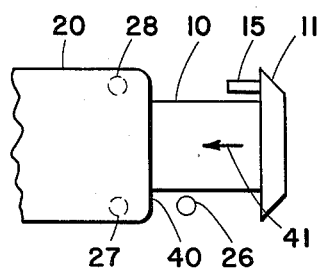
FIG. 5 shows the apparatus of FIG. 4 with material deposited at the proper rate for the linear speed of the head.

FIG. 5, on the other hand, illustrates a condition at which the insulation material 20 obstructs the light paths of the detectors 27 and 28, but not the light path of the detector 26. This is a condition which is desirable, indicating a proper flow rate.

Figure 6:
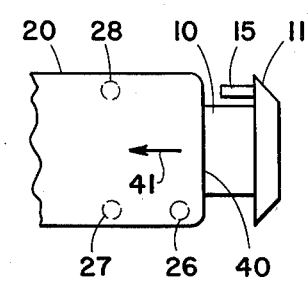
FIG. 6 is a side elevation of the apparatus of FIG. 4 with the material deposited at an excessive rate as compared to the relative linear speed of the head.

In FIG. 6, the insulation material has been deposited at a rate at which the light paths for all of the detectors are interrupted or obstructed, indicating a condition at which the flow material 20 is being deposited at an undesirably high rate compared to the relative linear speed of the head.

At this juncture it should be again pointed out that the deposition of the material 20 onto the pipe 10 is a dynamic or moving process. Therefore, it can be appreciated that the deposition rate of the material 20 onto the pipe is an ongoing situation with the face or flow front 40 of the deposited material advancing in the direction of the nozzle 15 continuously, but at the same time, being carried away from the nozzle 15 by the relative movement between the pipe 10 and head 11, in the direction of the arrow 41 shown. Thus, upon the occurrence of the condition of FIG. 4, the light paths of detectors 26 and 27 being unobstructed, the relative speed between the pipe 10 and nozzle 15 is indicated to be too fast resulting in an increased rate per unit length of pipe onto which the flow material is deposited. On the other hand, when the condition illustrated by FIG. 5 occurs, that is, the light path between detectors 26 being unobstructed and detector 27 being obstructed, the deposition rate is correct, and no change is indicated. Finally, when the light paths between detectors 26 and 27 are both obstructed, as shown in FIG. 6, the relative rate of movement between the pipe 10 and nozzle 15 is indicated to be too slow, and should be increased. A most important function served here is the control of the relative injection rate of the coating material into the flow front. In the case of Urethane "foam", for instance, with high expansion ratios, the sensor 27 prevents "fresh" material from being injected too far into reacting with "older" material. Further, the sensor 26 prevents fouling of the material delivery discharge and adjacent equipment associated with or carried by the head 11.

On the other hand, sensor 27 controls the minimum allowable injection velocity into the flow front. Should the injection velocity drop too low, which is a function of distance from the material injection point, the flow front could collapse due to a loss of flow dynamics.

The change in the relative speed between the nozzle 15 (or head 11) and the pipe 10 can be achieved mechanically in response to signals from the detectors 26 and 27 derived, for example, from well known logic circuits (not shown). Thus, for instance, a typical logic circuit would distinguish between the absence of signals from both detectors 26 and 27 to produce a signal or voltage to the motor or drive means (not shown) to speed up the relative movement between the pipe 10, or the nozzle 15. Likewise, the logic circuit could distinguish a condition at which signals are sent and received by both detectors 26 and 27, as shown in FIG. 4, to produce a signal or voltage to slow down the motor or driving means to reduce the speed between the pipe 10 and the nozzle 15. Finally, the circuit could detect a signal sent and received by detector 26, but the absence of a signal by detector 27, developing no change in voltage, thereby enabling the drive motor to continue at its steady state rate. Such logic circuit can, for example, be an AND gate and a NOR gate to each of which the output of the light detectors 26B and 27B is applied as inputs. Thus, only when a signal is applied from both light sensors 26B and 27B will an output exist from the AND gate. Upon the occurrence, the output can, for example, cause a relay to close, applying a decreased voltage to the drive motor. Likewise, only when there is no input or signal from the light detectors will an output be presented upon the NOR gate, thereby opening or activating, for example, a second relay applying an increased voltage to the drive motor.

Figure 7:
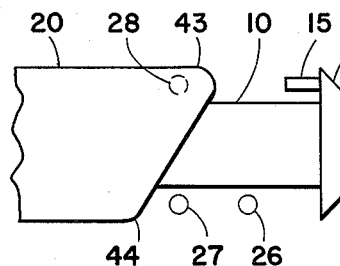
FIG. 7 is a side elevation diagrammatically showing the apparatus of FIG. 2 with material deposited containing excessive blowing agent.
Figure 8:
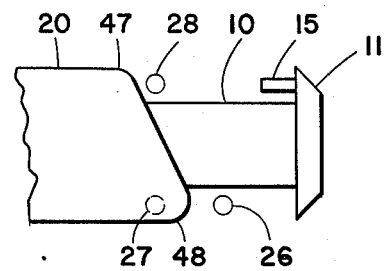
FIG. 8 is a side elevation of the apparatus of FIG. 7 with the material deposited containing insufficient blowing agent.

In order to minimize "corrections" by the controller, a "base rate" speed may be established whereas after each "corrective" signal has been "satisfied," the power rate fixture or machine will return to this "base rate" until overriden by another required control signal. blowing Another situation which can occur in the deposition of the flow material onto the pipe is illustrated in FIGS. 7 and 8. FIG. 7 illustrates a condition in which too much blowing agent is mixed into the foam prior to its being dispensed from the nozzle 18 and deposited upon the pipe 10. (The insulation material generally includes a flow material, or blosing agent, such as freon or other liquid or gas to ensure, among other things, that the insulation material completely flows around the pipe to form a uniform donut shape.) Thus, in FIG. 7, insufficient flowability is presented, resulting from too much blowing agent, causing an increased deposit at the top 43 of the pipe and insufficient deposit at the bottom 44 of the pipe. The increased portion 43 at the top of the pipe will obstruct the light path of the detector 28, but the decreased deposit 44 at the bottom of the pipe will not obstruct the light path of the detector 27. When this occurs, an appropriate relay or other control element is activated to decrease the blowing agent to inject less blowing agent into the foam ingredients and increase the flowability of the deposited foam. On the other hand, in the condition illustrated in FIG. 8, an insufficient amount of blowing agent is present in the material deposited, resulting in an undesirably high flowability of the deposited material. The high flowability results in a portion 47 at the top of the pipe 10 which has an insufficient deposit of flow material, and a portion 48 at the bottom of the pipe which has an excessive deposit. The insufficient portion 47 will, therefore, not obstruct or interfere with the light path of the detector 28, but, on the other hand, the excessive flow will obstruct the light path of the detector 27 on the bottom of the pipe. This condition will result in closing or activating the relay or control element to increase the blowing agent to thereby reduce the flowability of the deposited foam.

This control can be achieved by well known electronic logic circuitry. For example, the outputs from the sensors 27 and 28 can be each inputted into both of a pair of AND gates, the output of detector 27 being first inverted into the first AND gate, and the output of the detector 28 being first inverted into the second AND gate. Thus, the AND gate having the inverted output from detector 27 will produce a signal only when the output from detector 27 is zero and the output from detector 28 is one (corresponding to obstructed and nonobstructed light paths, shown in FIG. 8). In this state, when a signal is presented from the first AND gate, a relay is closed to increase the blowing agent injected into the foam from the nozzle 15. On the other hand, the second AND gate will produce an output only when there is a signal from the detector 27 and no signal from the detector 28 (corresponding to an obstructed light path 28 and an unobstructed light path of detector 27, shown in FIG. 7). In this condition, the second AND gate produces an output which closes a second relay to decrease the blowing agent in the foam from the nozzle 15. Thus, the resultant angle generated by the flow characteristics of the material being applied is oriented by the plane formed by the direction of progression of the mass application and the line formed between the sensors 27 and 28. Depending on the flow properties of the material being applied, this angle may be adjusted by positioning the sensors 27 and 28. In the case of the "flowing donut" illustrated, this angle is generally near 90°. However, as particular changes in applied foam density occur, this angle may be readjusted for different formulations, and may be adjusted during application. The significance of this function, especially in the case of expanding Urethanes, is that optimum properties of the applied insulation are attained when a specified amount of blowing agent is injected into the system. The flow front of the expanding foam has an optimum relative angle for each formulation; this angle is controlled by the flowability of the applied foam which is in turn, at the proper temperature and ratio, determined by the amount of blowing agent present in the system. However, due to normal material and equipment variations, these factors that ultimately affect flowability, are continuously compensated for by the sensor 27, in conjunction with the sensor 28.

Figure 9:
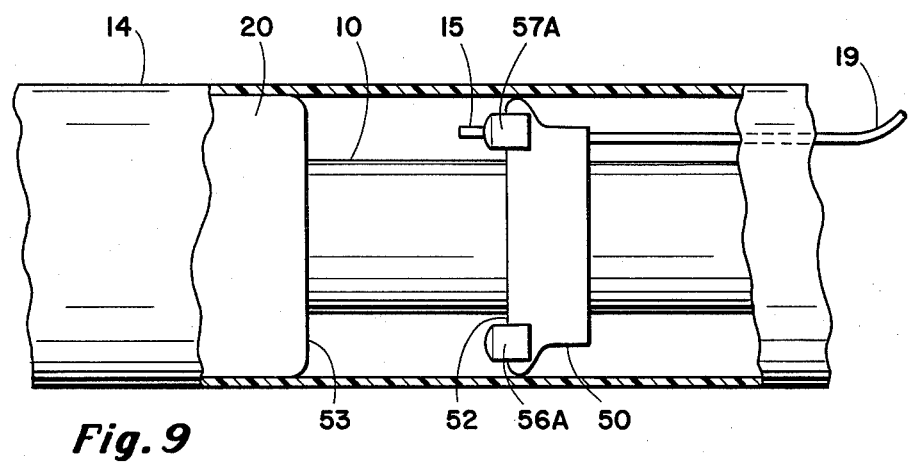
FIG. 9 is a side elevation, partially cut away, of an alternative embodiment of the invention, in which the light sources and sensors are located on a single horizontal plane and carried by the head assembly.
Figure 10:
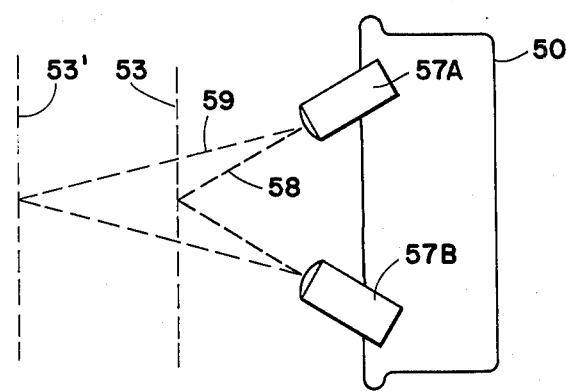
FIG. 10 is a diagrammatic illustration of the operation of the light sensors and detectors of FIG. 9.

An alternative embodiment of the sensor arrangement is shown in FIGS. 9 and 10. In that embodiment, as above described with reference to the embodiments of FIGS. 1–3, a foam material 20 is deposited onto a pipe 10 within the annulus between the pipe 10 and an outer jacket 14 by a nozzle 15, supplied by a tube 19 from a source (not shown). The nozzle 15 in the alternative embodiment illustrated is carried by a head 50, which encircles the pipe 10, and which is moved along the pipe 10 in any convenient manner, for example by a powered crawler unit (not shown) as previously mentioned, or possibly by the pressure within the space between the front surface 52 of the head 50 and the surface 53 of the deposited foam 20. Carried at lateral locations on the head 50 are detectors 56 and 57, including emitter portions denoted by the reference numerals 56A and 57A, and sensing portions, denoted by the reference numerals 56B and 57B.

The light source and sensors of the detectors 57A and 57B are located at spaced-apart locations on the head 50, as shown in FIG. 10. The light source and light sensor portions of each of the detectors are mounted at an angle with respect to each other, as shown in FIG. 10, and are located at locations above and below the pipe 10, as shown in FIG. 9. Thus, the sensors 56 and 57 function to detect the flow front 53 at positions 53 and 53' (see FIG. 10) depending upon the angle of the light paths 58 and 59 reflected from the respective flow fronts. Being arranged at different vertical locations, the sensors within the deposition cavity can also be made to sense variations in the departure from vertical of the deposited front 53, in a manner similar to that above described with reference to FIGS. 7 and 8.

Figure 11:
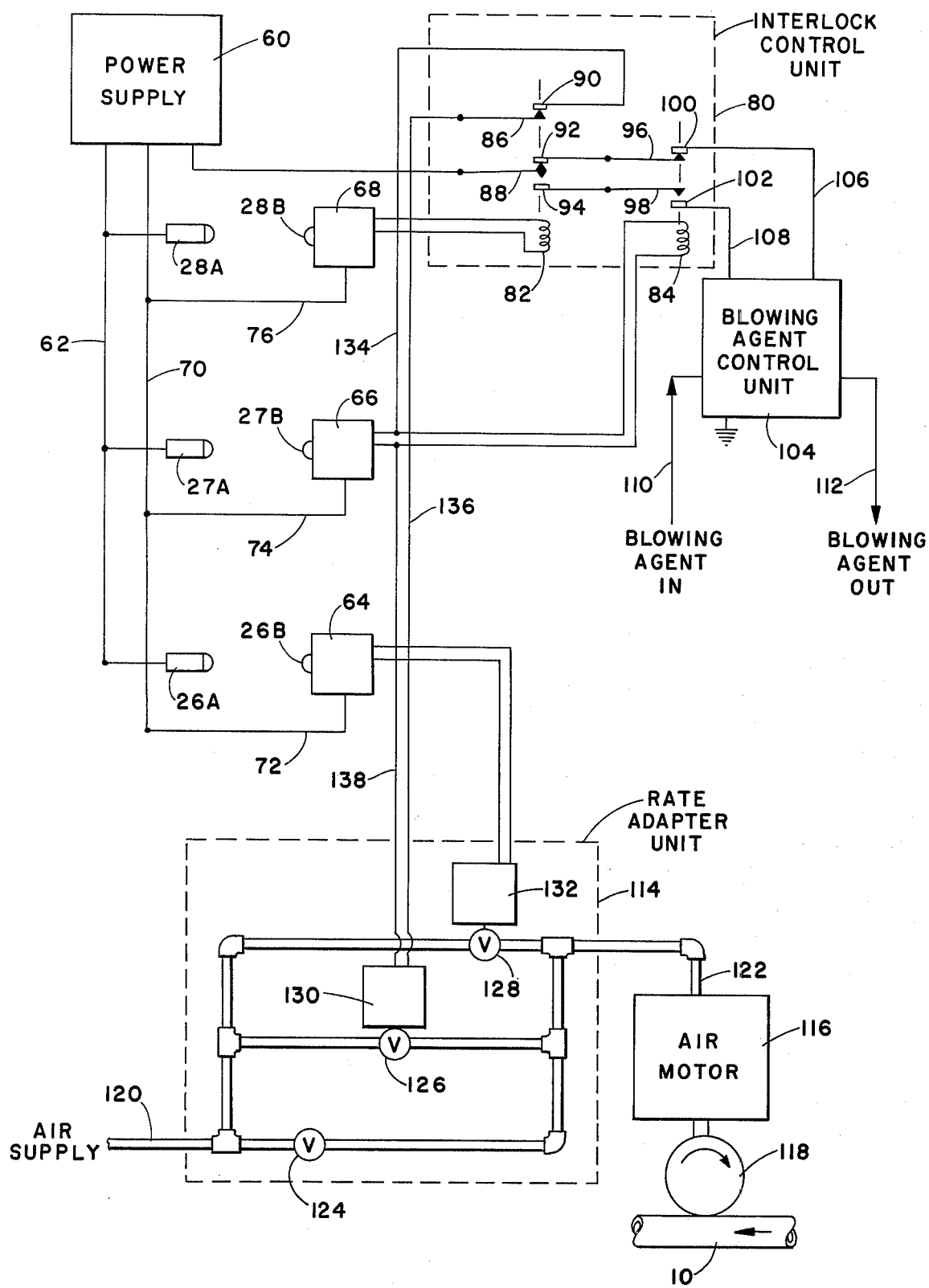
FIG. 11 is a combined electrical and pneumatic circuit diagram showing by way of illustration only, a control circuit which can be employed with the present invention.

Although the means for moving the head 11 at a variable linear rate relative to the pipe 10 and the means for maintaining the vertical disposition of the flow front have been described above in such manner that the man skilled in the art would be able to practice the invention disclosed herein, another specific circuit diagram is shown in FIG. 11, purely by way of illustration and not by way of limitation. Thus, FIG. 11 shows a combined electrical and pneumatic circuit for controlling the relative linear speed of the pipe 10 and also for controlling the relative amount of blowing agent introduced into the material which is applied to the annular area.

FIG. 11 shows an electrical power supply 60 supplying power to the light emitter elements 26A, 27A and 28A through the lead 62. The power supply 60 also provides suitable power to the units 64, 66 and 68 housing the sensor elements 26B, 27B and 28B, respectively; the power supply is connected to the units 64, 66, 68 through leads 70, 72, 74, and 76. In the specific circuit shown, only unit 66 is adapted to produce an output signal when the sensor 27B receives light from its associated light emitter member 27A. The other two units 64 and 68 and adapted to produce output signals when the path of light is interrupted from their light emitting portions 26A and 28A to their sensor portions 26B and 28B, respectively.

Thus, for the conditions shown in FIG. 4, only the unit 66 would be providing an output signal. Similarly, for the conditions represented by FIG. 5, only the unit 68 would be providing an output signal. For the conditions shown in FIG. 6, units 64 and 68 would be providing output signals. For the conditions shown in FIG. 7, the units 66 and 68 would be providing output signals. Finally, for the conditions shown in FIG. 8 none of the units would be providing output signals.

FIG. 11 shows an interlock control unit 80 containing two relays 82 and 84 therein. The coil of relay 82 is connected to the unit 68 housing the sensor 28B and the coil of relay 84 is connected to the unit 66 housing the sensor 27B. Relay 82 contains two movable contact members 86 and 88. When the realy 82 is deenergized the upper movable contact member 86 is in contact with a fixed contact 90, and the lower movable contact 88 is in contact with a fixed contact 92. When the relay 82 becomes energized, the connection between movable contact 86 and fixed contact 90 is interrupted; similarly, when the relay 82 is energized, the connection between the movable contact 88 and fixed contact 92 is interrupted; however, when the movable contact 88 moves away from the fixed contact 92, it makes contact with a lower fixed contact 94.

The relay 84 also has two movable contacts 96 and 98. When the relay 84 is deenergized, the upper movable contact 96 is connected to an upper fixed contact 100 and the lower movable contact 98 is not in contact with anything. When the relay 84 is energized, however, the connection between the movable contact 96 and the fixed contact 100 is broken and, at the same time, the movable contact 98 moves downwardly and makes an electrical connection with a fixed contact 102. The contact 100 connects with a blowing agent control unit 104 which houses a valve (not shown) for controlling the quantity of blowing agent supplied to the system. The control unit 104 also houses a motor (not shown) which is used to operate the control valve. The contact 100 is connected to the unit 104 by means of a lead 106. The contact 102 is also connected to the unit 104 by means of a lead 108. When power is supplied to the unit 104 through the lead 106, this serves to operate the motor in the unit 104 so as to tend to open the valve therein to increase the amount of blowing agent incorporated in the material supplied to the annulus 16. Contrari-wise when power is supplied to the unit 104 through the lead 108, this serves to drive the motor in such a direction as to tend to close the valve and thereby decrease the quantity of blowing agent supplied to the foam material. The blowing agent is shown flowing into the unit 104 through a conduit 110 and coming out of the unit 104 through a conduit 112.

FIG. 11 also shows a rate adapter unit 114 which controls the amount of air supplied to an air motor 116. The air motor 116 drives a wheel 118 which is in contact with the pipe 10 so as to move the pipe relative to the head 11. The air is supplied to the rate adapter unit through a pipe 120. The rate adapter unit supplies air to the air motor by means of a pipe 122. Within the rate adapter unit 114 are three valves, 124, 126, and 128. The valve 124 is a manually adjustable valve which is adjusted in advance to provide a rate of linear movement of the pipe 10 which is slightly less than the desired optimum rate of linear movement. Valve 126 is a normally open valve which supplements the flow through the valve 124 to drive the pipe 10 at a linear speed equal to or slightly greater than the desired rate of speed. The valve 126, however, has a solenoid control unit 130 associated therewith. When the solenoid control unit 130 is energized it will close the valve 126 so as to slow down the air motor 116 and reduce the linear speed of travel of the pipe 10. It should be noted, of course, that the valves 124, 126, and 128 are all connected in parallel between the inlet pipe 120 and the outlet pipe 122. The valve 128 is a normally closed valve. This valve has associated therewith a solenoid control unit 132 which is similar to the solenoid control unit 130. When the solenoid control unit 132 is energized, it operates to open the valve 128 so as to increase the rate of speed of the air motor 116 and thereby increase the linear rate of travel of the pipe 10.

When the condition shown in FIG. 6 occurs, the unit 64 sends a output signal to the solenoid control unit 132 so as to open the valve 128 and increase the rate of speed of the air motor 116 and, at the same time, increase the linear rate of speed of the pipe 10 so as, hopefully, to return the operation to the condition shown in FIG. 5, at which time the signl from the unit 64 is interrupted and the valve 128 closes.

The relative conditions and effects of units 66 and 68 will now be considered in connection with the condition of FIG. 6. As indicated previously, the unit 66 is the only unit energized when light passes from its light emitter portion 27A to its light sensor portion 27B; thus, as far as FIG. 6 is concerned, of the two units 66 and 68, only the unit 68 will be providing an output signal which means that the connection between contact 86 and 90 will be interrupted, the connection between movable contact 88 and fixed contact 92 will be interrupted and the movable contact 88 will be making contact with the fixed contact 94. Since the relay 84 is deenergized there will be no supply of power from the power supply 60 through either lead 106 or 108 to the blowing agent control unit 104.

The situation described in the above with respect to units 66 and 68 is the same with respect to the FIG. 5 position.

However, if the FIG. 4 position is reached, unit 66 will be providing an output signal whereas unit 68 will not be providing an output signal. Under these conditions, there is still no supply of power from the power supply to the blowing agent control unit 104. On the other hand, the unit 66 will send a signal through the lead 134, through the contacts 90 and 86, through lead 136 to the solenoid control unit 130. Another lead 138 completes the circuit from the solenoid control unit 130 back to the unit 66. Therefore, under the conditions shown in FIG. 4, the valve 126 will be closed to slow down the air motor 116 and reduce the linear speed of the pipe 10.

Turning now to consideration of FIG. 7, under the conditions shown therein, both units 66 and 68 will be providing output signals. Thus, movable contact 88 will be making an electrical connection with the fixed contact 94 and movable contact 98 will be making contact with a fixed contact 102 thereby completing an electrical circuit from the power supply 60 to the blowing agent control unit 104 to the lead 108 so as to relatively close the valve in the unit 104 and decrease the quantity of the blowing agent introduced into the foam material.

Turing now to a consideration of FIG. 8, neither units 66 or 68 will be providing an output signal and, thus, neither relay 82 or 84 will be energized. However, with the contacts in the position shown in FIG. 11 there will be an electrical circuit from the power supply 60 through the lead 106 to the blowing agent control unit 104 so as to relatively open the valve therein and increase the quantity of blowing agent which is mixed with the material supplied to the annulus 16. Even though the contacts 86 and 90 are connected to each other, there will be no signal supply to the solenoid control unit 130 because the unit 66 is not providing an output signal at this time.

Whereas, the relative rate of deposition of foam material into the annular cavity has been described specifically in terms of varying the relative linear speed of the deposition assembly with respect to the pipe or other elongated object (in one instance the pipe being variably movable with respect to a fixed deposition assembly and in another instance, vice versa) it should be understood that the relative rate of longitudinal movement between these two elements could be maintained reasonably constant and the variable rate of deposition accomplished by varying the rate of introduction of the total amount of material introduced into the annular cavity per unit of time.

Although the invention has been described and illustrated with a certain degree of particularity, it is understood that the present disclosure has been made only by way of example and that numerous changes in the details of constructions and combinations and arrangement of parts may be resorted to without departing from the spirit and scope of the invention as hereinafter claimed

What is claimed is:

1. In an apparatus wherein a foamable material is deposited into an annular cavity formed around an elongated object and wherein the material is deposited into said cavity from a deposition assembly which is moved longitudinally relative to said object, the combination with said deposition assembly of two material presence detectors spaced apart longitudinally along said object to increase the relative deposition rate if the material is not detected at the detector furthermost from the deposition assembly and to decrease the relative deposition rate if the material is detected at the closestmost detector to the deposition assembly.

2. The apparatus of claim 1 wherein said combination further comprises a third material presence detector for controlling the vertical disposition of the flow front resulting from the deposition of said material into said annular cavity, said two longitudinally spaced detectors being located to detect material on one side of a longitudinal axis of said object and said third detector being located to detect material on another side of said axis opposite said closestmost detector, and further comprising means for controlling the rate of introduction of a flow controlling agent into said material operated by said third detector and said furthestmost detector to increase the introduction rate of said flow controlling agent when the upper portion of said flow front is forward of the lower portion thereon and to decrease the introduction rate when the lower portion of said flow front is forward of the upper portion thereof.

3. Apparatus for controlling the deposition of a foamable material into an annular cavity surrounding a pipe from a deposition assembly moved relative to the length of said pipe, comprising;

first and second material detectors disposed at longitudinally spaced apart positions adjacent said pipe for detecting the presence of material at said spaced apart locations, and means responsive to signals from said detectors for increasing the relative rate of movement between said pipe and said deposition assembly when material is detected by said first detector at the location closest to said deposition assembly, and for decreasing said relative rate when material is not detected by said second detector at the location furthest from said deposition assembly.

4. The apparatus of claim 3 wherein the location detected by said second detector is a bottom location of said pipe and further comprising, a third detector located at a top side of said pipe opposite said second detector, and means responsive to said second and third detectors for decreasing the flowability of said material when said material is not detected by said first and third detectors and for increasing the flowability when said material is not detected by said first and second detectors.

5. The apparatus of claim 4 wherein said detectors each comprises a light source and a light sensor whereby material deposited upon said pipe adjacent the detector interrupts the light path between its source and its sensor.

6. The apparatus of claim 3 wherein said first and second detectors are carried upon said deposition assembly.

7. The apparatus of claim 6 wherein each of said detectors comprises a light source and a light sensor, said source being located on said deposition assembly whereby the presence of material at a respective one of said spaced apart locations defines a light reflection path between said source and said sensor.

8. The apparatus of claim 3 wherein said detectors are located below the bottom portion of said pipe and externally of said annular cavity, and each detector comprises a light source and a light sensor located at transversely opposite sides of said pipe to define a light path therebetween and through a translucent jacket surrounding said annular cavity.

9. The apparatus of claim 8 further comprising a third detector located above the top portion of said pipe opposite one of said two detectors, and means for introuding a blowing agent into said material controllably connected to said third detector and said opposite one of said two detectors to maintain a front of said material in a substantially vertical plane.

* * * * *